US011373026B2

(12) United States Patent
Barr et al.

(10) Patent No.: US 11,373,026 B2
(45) Date of Patent: Jun. 28, 2022

(54) DEEP LEARNING SURROGATE FOR TURBULENT FLOW

(71) Applicant: General Electric Company, Schenectady, NY (US)

(72) Inventors: Brian Chandler Barr, Niskayuna, NY (US); Johan Reimann, Niskayuna, NY (US); Marc Edgar, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 304 days.

(21) Appl. No.: 16/436,024

(22) Filed: Jun. 10, 2019

(65) Prior Publication Data

US 2020/0387579 A1 Dec. 10, 2020

(51) Int. Cl.
*G06F 30/367* (2020.01)
*G06N 3/08* (2006.01)

(52) U.S. Cl.
CPC ............ *G06F 30/367* (2020.01); *G06N 3/08* (2013.01)

(58) Field of Classification Search
CPC ................................ G06F 30/367; G06N 3/08
See application file for complete search history.

(56) References Cited

U.S. PATENT DOCUMENTS

| 2013/0282629 | A1* | 10/2013 | Rajnarayan | G01M 9/08 706/12 |
| 2020/0331602 | A1* | 10/2020 | Mikic | B64C 11/18 |
| 2020/0332764 | A1* | 10/2020 | Yu | F03D 3/005 |

OTHER PUBLICATIONS

Jung (Jung, U. H., Kim, J. H., Kim, S., Kim, J. H., & Choi, Y. S. (2016). Analyzing the shape parameter effects on the performance of the mixed-flow fan using CFD & Factorial design. Journal of Mechanical Science and Technology, 30(3), 1149-1161.) (Year: 2016).*
Bai (Bai, C. A., & Zhou, C. (Jun. 2018). Pressure Predictions of Turbine Blades with Deep Learning. arXiv preprint arXiv: 1806.06940.) (Year: 2018).*

* cited by examiner

*Primary Examiner* — Bijan Mapar
(74) *Attorney, Agent, or Firm* — Buckley, Maschoff & Talwalkar LLC

(57) ABSTRACT

The example embodiments are directed to a system and method for predicting a flow about an object through the use of a predictive model instead of a machine simulation. Traditional CFD simulations can take hours, even days. The example embodiments provide a predictive model that can predict a CFD flow in seconds which greatly improves design time. In one example, the method may include receiving input data comprising shape parameters of a geometric object and flow parameters associated with the geometric object, predicting, via execution of a predictive model, a computational fluid dynamic (CFD) flow about the geometric object based on the shape parameters and the flow parameters included in the input data, and outputting one or more attributes of the predicted CFD flow about the geometric object via a display device.

15 Claims, 6 Drawing Sheets

DEEP LEARNING SURROGATE FOR TURBULENT FLOW

BACKGROUND

Machine and equipment assets are engineered to perform particular tasks as part of a process. For example, assets can include, among other things, industrial manufacturing equipment on a production line, drilling equipment for use in mining operations, wind turbines that generate electricity on a wind farm, transportation vehicles (trains, subways, airplanes, etc.), gas and oil refining equipment, and the like. As another example, assets may include devices that aid in diagnosing patients such as imaging devices (e.g., X-ray or MRI systems), monitoring equipment, and the like. The design and implementation of these assets often takes into account both the physics of the task at hand, as well as the environment in which such assets are configured to operate.

Low-level software and hardware-based controllers have long been used to drive machine and equipment assets. However, the overwhelming adoption of cloud computing, increasing sensor capabilities, and decreasing sensor costs, as well as the proliferation of mobile technologies, have created opportunities for creating novel industrial and healthcare based assets with improved sensing technology and which are capable of transmitting data that can then be distributed throughout a network. As a consequence, there are new opportunities to enhance the business value of some assets through the use of novel industrial-focused hardware and software.

Various industrial fields (e.g., aircraft, gas turbine, steam turbine, etc.) rely on computational fluid dynamics (CFD) during design and implementation of parts thereof. In these examples, CFD is used to create simulations which represent how fluid (e.g., gas, liquid, etc.) flows around an object such as a wing, air foil, blade, etc. Current design simulations for turbomachinery utilize significant number of CPU hours running CFD simulations on high performance computing (HPC) clusters to generate simulated flows. For simple designs, the simulation process can take a few hours. However, for more complex designs, the simulation process can take days, weeks, or even longer. Accordingly, a new mechanism is needed by which CFD flows can be determined without requiring significant computation time.

SUMMARY

The embodiments herein improve upon the prior art by providing a predictive model that can predict fluid flows with respect to an objection such as an airfoil, an engine, a machine body, a mass, or the like, without the need to perform a time-consuming simulation. The predictive model can predict a CFD airflow in seconds rather than hours, days, or weeks as is required by a CPU-driven simulation. In operation, the system can receive an input file that includes parameters of the object and the flow (e.g., geometric shape, flow parameters, etc.) similar to an input for a CFD simulation. Furthermore, the system can translate or otherwise convert the input file into a configuration format that can be processed using the predictive model. Furthermore, the system can process the translated data based on the predictive model to generate and output information about a predicted CFD flow. The output of the system can be similar to the output of a traditional CFD simulation system. Accordingly, the predictive model described herein can be used to replace (i.e., a surrogate) a traditional CFD simulation.

In an aspect of an example embodiment, a computing system may include a storage configured to store input data that may include shape parameters of a geometric object and flow parameters associated with the geometric object, and a processor configured to predict, via execution of a predictive model, a computational fluid dynamic (CFD) flow about the geometric object based on the shape parameters and the flow parameters included in the input data, and output one or more attributes of the predicted CFD flow about the geometric object via a display device.

In an aspect of another example embodiment, a method may include receiving input data comprising shape parameters of a geometric object and flow parameters associated with the geometric object, predicting, via execution of a predictive model, a computational fluid dynamic (CFD) flow about the geometric object based on the shape parameters and the flow parameters included in the input data, and outputting one or more attributes of the predicted CFD flow about the geometric object via a display device.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
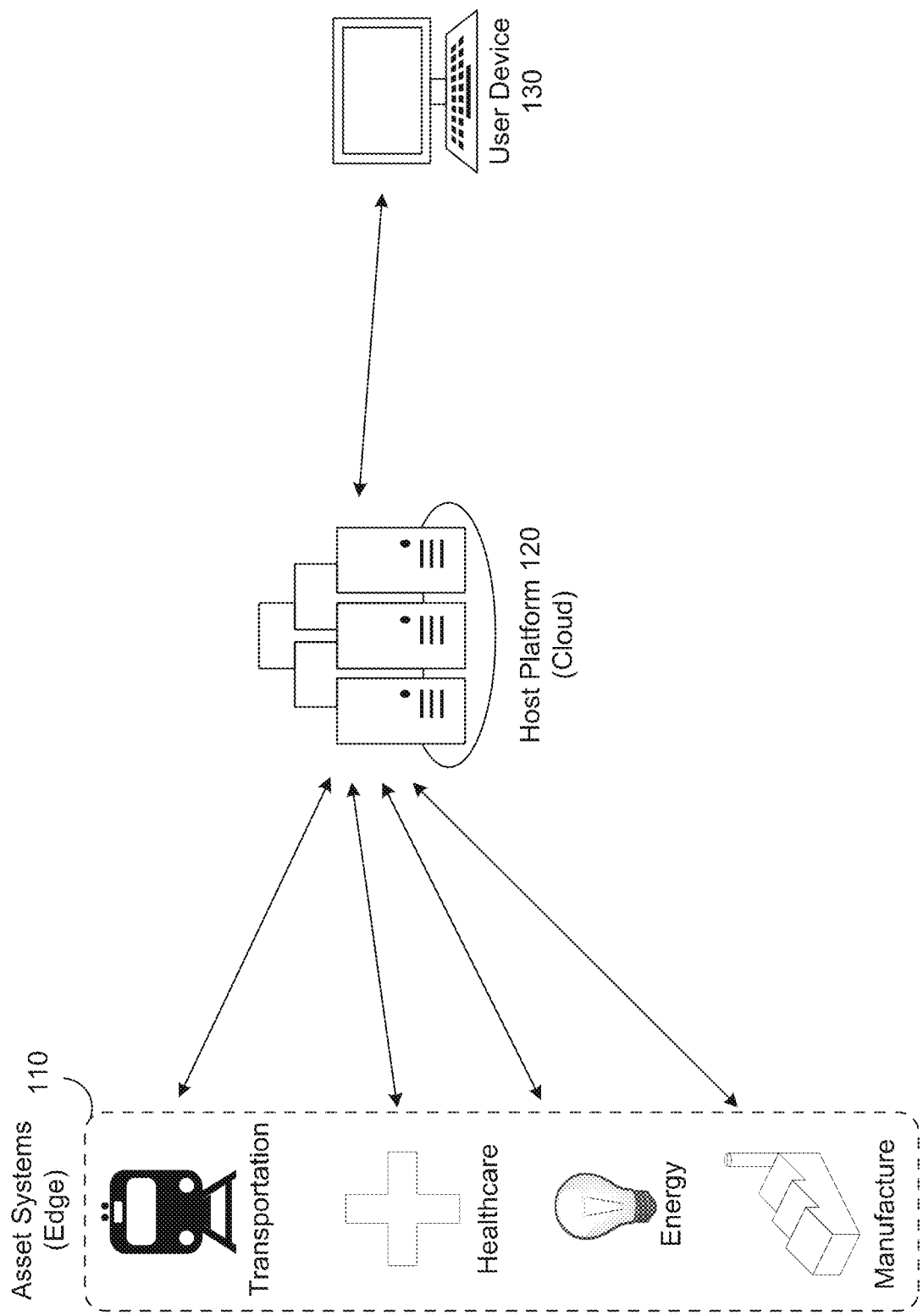
FIG. 1 is a diagram illustrating an industrial cloud computing environment in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

Computational fluid dynamics (CFD) is the use of applied mathematics, physics and computational software to visualize how a fluid such as a gas or liquid flows about an object as well as how the gas or liquid affects objects as it flows past. Computational fluid dynamics is based on Navier-Stokes equations. These equations describe how the velocity, pressure, temperature, and density of a moving fluid are related.

Traditionally, computers are used to perform the calculations required to simulate the free-stream flow of the fluid, and the interaction of the fluid (liquids and gases) with surfaces of an object which are defined by boundary conditions. With high-speed supercomputers, better solutions can be achieved, and are often required to solve the largest and most complex problems. Ongoing research has yielded software that improves the accuracy and the speed of complex simulation scenarios such as transonic or turbulent flows. Initial validation of such software is typically performed using an experimental apparatus such as wind tunnels or other physical spaces. In addition, previously performed analytical or empirical analysis of a particular problem can be used for comparison. A final validation is often performed using full-scale testing, such as flight tests.

In contrast, the example embodiments provide a surrogate for a CFD simulation by replacing simulations with a predictive algorithm that can predict a flow about an object based on traditional CFD input data. That is, rather than simulating flow on super computers, etc., the example embodiments can predict airflows based on a predictive model. The flow may include a flow of material such as liquid, gases, air, and the like. The system described herein leverages deep learning to train the predictive model to replicate the results of the CFD simulations. For turbomachinery designers, it essentially puts HPC capability on a desktop computer with a significant reduction in time. Once trained, the deep learning model surrogate can make a prediction for a CFD flow solution in a matter of seconds as opposed to the hours (or even days) it would take to run on HPC. As a result, the deep learning surrogate model for CFD reduces the time it takes for a designer (or CFD practitioner) to get a flow solution given a grid (representing a discretized model of the actual geometry of interest).

Some of the technical benefits of the system described herein include a significantly shortened analysis wait time, improvement in a loop optimization process, and providing an enabling technology for automatic optimization. Current practitioners of deep learning are involved with non-industrial technologies such as e-commerce or social media. That is, industrial engineers do not rely on a deep learning space of speech recognition, image analysis or optimal advertising placement. The example embodiments provide a fusion of deep learning and CFD which creates a clear differentiator for design capability which is previously unknown in the art. Furthermore, in some embodiments, the system may follow a purely machine learning approach that is separate and distinct from "first principles" physics based approaches (e.g. CFD solvers).

The system described herein may be implemented via a program or other software that may be used in conjunction with applications for managing machine and equipment assets hosted within an industrial internet of things (IIoT).

An IIoT may connect assets, such as turbines, jet engines, locomotives, elevators, healthcare devices, mining equipment, oil and gas refineries, and the like, to the Internet or cloud, or to each other in some meaningful way such as through one or more networks. The cloud can be used to receive, relay, transmit, store, analyze, or otherwise process information for or about assets and manufacturing sites. In an example, a cloud computing system includes at least one processor circuit, at least one database, and a plurality of users and/or assets that are in data communication with the cloud computing system. The cloud computing system can further include or can be coupled with one or more other processor circuits or modules configured to perform a specific task, such as to perform tasks related to asset maintenance, analytics, data storage, security, or some other function.

Assets may be outfitted with one or more sensors (e.g., physical sensors, virtual sensors, etc.) configured to monitor respective operations or conditions of the asset and the environment in which the asset operates. Data from the sensors can be recorded or transmitted to a cloud-based or other remote computing environment. By bringing such data into a cloud-based computing environment, new software applications informed by industrial process, tools and know-how can be constructed, and new physics-based analytics specific to an industrial environment can be created. Insights gained through analysis of such data can lead to enhanced asset designs, enhanced software algorithms for operating the same or similar assets, better operating efficiency, and the like.

While progress with industrial and machine automation has been made over the last several decades, and assets have become 'smarter,' the intelligence of any individual asset pales in comparison to intelligence that can be gained when multiple smart devices are connected together, for example, in the cloud. Aggregating data collected from or about multiple assets can enable users to improve business processes, for example by improving effectiveness of asset maintenance or improving operational performance if appropriate industrial-specific data collection and modeling technology is developed and applied.

The integration of machine and equipment assets with the remote computing resources to enable the IIoT often presents technical challenges separate and distinct from the specific industry and from computer networks, generally. To address these problems and other problems resulting from the intersection of certain industrial fields and the IIoT, the example embodiments provide a system which can re-partition storage of asset data based on unexpected features and changes within the data as it is fed to the storage.

Asset management platforms enabled by state of the art cutting edge tools and cloud computing techniques that enable incorporation of a manufacturer's asset knowledge with a set of development tools and best practices that enables asset users to bridge gaps between software and operations to enhance capabilities, foster innovation, and ultimately provide economic value. Through the use of such a system, a manufacturer of industrial or healthcare based assets can be uniquely situated to leverage its understanding of assets themselves, models of such assets, and industrial operations or applications of such assets, to create new value for industrial customers through asset insights.

As described in various examples herein, data may include a raw collection of related values of an asset or a process/operation including the asset, for example, in the form of a stream (in motion) or in a data storage system (at rest). Individual data values may include descriptive metadata as to a source of the data and an order in which the data was received, but may not be explicitly correlated. Information may refer to a related collection of data which is imputed to represent meaningful facts about an identified subject. As a non-limiting example, information may be a dataset such as a dataset which has been determined to represent temperature fluctuations of a machine part over time.

FIG. 1 illustrates a cloud computing system 100 for industrial software and hardware in accordance with an example embodiment. Referring to FIG. 1, the system 100 includes a plurality of assets 110 which may be included within an edge of an IIoT and which may transmit raw data to a source such as cloud computing platform 120 where it may be stored and processed. It should also be appreciated that the cloud platform 120 in FIG. 1 may be replaced with or supplemented by a non-cloud based platform such as a server, an on-premises computing system, and the like. Assets 110 may include hardware/structural assets such as machine and equipment used in industry, healthcare, manufacturing, energy, transportation, and that like. It should also be appreciated that assets 110 may include software, processes, actors, resources, and the like. A digital replica (i.e., a digital twin) of an asset 110 may be generated and stored on the cloud platform 120. The digital twin may be used to virtually represent an operating characteristic of the asset 110.

The data transmitted by the assets 110 and received by the cloud platform 120 may include raw time-series data output as a result of the operation of the assets 110, and the like. Data that is stored and processed by the cloud platform 120 may be output in some meaningful way to user devices 130. In the example of FIG. 1, the assets 110, cloud platform 120, and user devices 130 may be connected to each other via a network such as the Internet, a private network, a wired network, a wireless network, etc. Also, the user devices 130 may interact with software hosted by and deployed on the cloud platform 120 in order to receive data from and control operation of the assets 110.

Software and hardware systems can be used to enhance or otherwise used in conjunction with the operation of an asset and a digital twin of the asset (and/or other assets), may be hosted by the cloud platform 120, and may interact with the assets 110. For example, ML models (or AI models) may be used to optimize a performance of an asset or data coming in from the asset. As another example, the ML models may be used to predict, analyze, control, manage, or otherwise interact with the asset and components (software and hardware) thereof. The ML models may also be stored in the cloud platform 120 and/or at the edge (e.g. asset computing systems, edge PC's, asset controllers, etc.)

The user device 130 may receive views of data or other information about the asset as the data is processed via one or more applications hosted by the cloud platform 120. For example, the user device 130 may receive graph-based results, diagrams, charts, warnings, measurements, power levels, and the like. As another example, the user device 130 may display a graphical user interface that allows a user thereof to input commands to an asset via one or more applications hosted by the cloud platform 120.

In some embodiments, an asset management platform (AMP) can reside within or be connected to the cloud platform 120, in a local or sandboxed environment, or can be distributed across multiple locations or devices and can be used to interact with the assets 110. The AMP can be configured to perform functions such as data acquisition, data analysis, data exchange, and the like, with local or remote assets, or with other task-specific processing devices. For example, the assets 110 may be an asset community (e.g., turbines, healthcare, power, industrial, manufacturing, mining, oil and gas, elevator, etc.) which may be communicatively coupled to the cloud platform 120 via one or more intermediate devices such as a stream data transfer platform, database, or the like.

Information from the assets 110 may be communicated to the cloud platform 120. For example, external sensors can be used to sense information about a function, process, operation, etc., of an asset, or to sense information about an environment condition at or around an asset, a worker, a downtime, a machine or equipment maintenance, and the like. The external sensor can be configured for data communication with the cloud platform 120 which can be configured to store the raw sensor information and transfer the raw sensor information to the user devices 130 where it can be accessed by users, applications, systems, and the like, for further processing. Furthermore, an operation of the assets 110 may be enhanced or otherwise controlled by a user inputting commands though an application hosted by the cloud platform 120 or other remote host platform such as a web server. The data provided from the assets 110 may include time-series data or other types of data associated with the operations being performed by the assets 110

In some embodiments, the cloud platform 120 may include a local, system, enterprise, or global computing infrastructure that can be optimized for industrial data workloads, secure data communication, and compliance with regulatory requirements. The cloud platform 120 may include a database management system (DBMS) for creating, monitoring, and controlling access to data in a database coupled to or included within the cloud platform 120. The cloud platform 120 can also include services that developers can use to build or test industrial or manufacturing-based applications and services to implement IIoT applications that interact with assets 110.

For example, the cloud platform 120 may host an industrial application marketplace where developers can publish their distinctly developed applications and/or retrieve applications from third parties. In addition, the cloud platform 120 can host a development framework for communicating with various available services or modules. The development framework can offer developers a consistent contextual user experience in web or mobile applications. Developers can add and make accessible their applications (services, data, analytics, etc.) via the cloud platform 120. Also, analytic software may analyze data from or about a manufacturing process and provide insight, predictions, and early warning fault detection.

Industrial data or asset-related data may include data that has been sensed by one or more sensors that are attached to an asset, sensors positioned within a surrounding environment of an asset, and the like. Asset-related data may include time-series data such as pressure, velocity, temperature, rotational force, noise (audio), humidity, and many others. As another example, asset-related data may include images captured of an asset such as the exterior, interior, hot spots, and the like. As another example, asset-related data may include audio, video, and/or the like. An asset outfitted with particular types sensors may be predicted to need a partitioning scheme based simply on the type of asset, the type of sensors, the role of the asset, the amount of sensors, and the like. However, the data fed back may be different than what was originally expected, or it may vary/change over time such that it no longer is of the type, amount, velocity, etc., that was expected.

Figure 2:
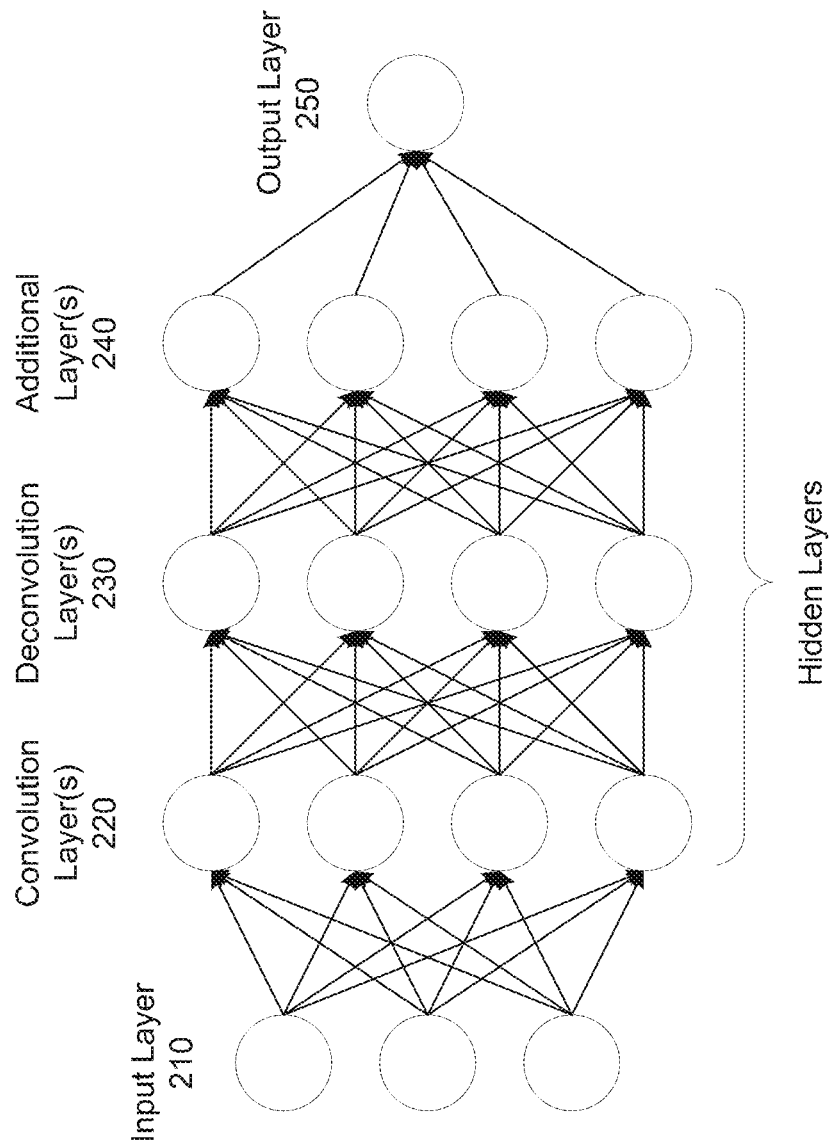
FIG. 2 is a diagram illustrating a deep learning neural network for training a CFD surrogate in accordance with example embodiments.

FIG. 2 illustrates a deep learning neural network 200 for training a CFD surrogate predictive model in accordance with example embodiments. A neural network may include a set of algorithms, modeled loosely after the human brain, which are designed to recognize patterns within the data. A neural network may interpret sensory data through a kind of machine perception, labeling or clustering raw input. The patterns that are recognized are numerical, contained in vectors, into which all real-world data, be it images, sound, text or time series, must be translated.

Referring to FIG. 2, the deep learning neural network 200 includes an input layer 210, an output layer 250, and a plurality of hidden layers. For example, the hidden layers may include one or more sets of convolution layers 220, one or more sets of deconvolution layers 230, and one or more additional layers 240. The input layer 210 may include one or more nodes that receive geometric parameters of a geometric object such as shapes, boundary lines, and the like. The geometric object may be the object which flow is passing through, around, etc. The input layer 210 may also include one or more nodes that receive as flow parameters (e.g., velocity, pressure, turbulence, density, enthalpy, temperature, etc.)

The convolutional layer(s) 220 may apply convolution operations to the input, passing the result to the next layer. The convolution emulates the response of an individual neuron to visual stimuli. Each convolutional neuron may process data only for its receptive field. The convolution operation brings a solution as it reduces the number of free parameters, allowing the network to be deeper with fewer parameters. In this way, it resolves the vanishing or exploding gradients problem in training traditional multi-layer neural networks with many layers by using backpropagation. Meanwhile, the deconvolutional layer(s) 230 may be used to learn the upsampling of an image. The deconvolutional layer(s) 230 can reverse the effects of the convolutional layer(s) 220. The additional layer(s) 240 may include dropout layers, or other algorithms for processing CFD flow.

According to various embodiments, the neural network 200 may borrow techniques developed for image processing (e.g., deep learning on images, etc.) The neural network 200 may identify patterns that are occurring in the image. In a greyscale image there is just one channel. In a color image there are three channels (red, green, blue). The neural network 200 leverages these deep learning tools for CFD which has a few more channels (e.g., 7 channels, 8 channels, etc.) for parameters such as flow, velocity in three directions, density, entropy, turbulence, etc. The neural network 200 may also create a representation of the geometry of the object (e.g., the airfoil). In an image you have pixels. They are typically on a rectangular grid and they are nice and uniform. However, a CFD grid is typically not rectangular but is instead non-uniform. The neural network 200 creates a representation of the object on the grid that is non-uniform.

The geometric object may include an airfoil, as described in some examples herein. However, other geometric objects are also possible. For example, anything that the flow touches would be applicable. Examples include, but are not limited to, end walls (hub, case, shroud), cavities, and the like. For external flows, in addition to airfoils, there are general bluff bodies and blended wings, etc.

The neural network 200 architecture uses the convolution layer(s) 220 to identify patterns in the input data. Like a filter, a convolution may pass through an image and it can help identify edges (early layers of the NN), groups of features (middle layers of the NN), larger global features (overall flow). For CFD, the neural network uses convolutions to identify small scale features (small scale turbulence, interaction of the flow with the boundary of the flow, etc.). Middle parts of the network may further identify medium scale features, and latter parts of the network may identify global features such as how the overall flow field is moving through the object, large-scale turbulence, etc. The neural network 200 creates a predictive model that represents flow around an airfoil.

An operator user may train the predictive model by running CFD simulations to verify the predictions. Here, the CFD simulations may be the ground truth. The training involves running the CFD multiple times to get actual results. Once the model has been built, the predictive model can make predictions based on never before seen data. The predictive model may be a non-linear interpolator which can make predictions about the flow field in previously unseen conditions. The predictive model is significantly faster than a CFD simulation. Meanwhile, the input/output to the predictive model software may be the same as if the data is being run on a CFD simulator.

Figure 3:
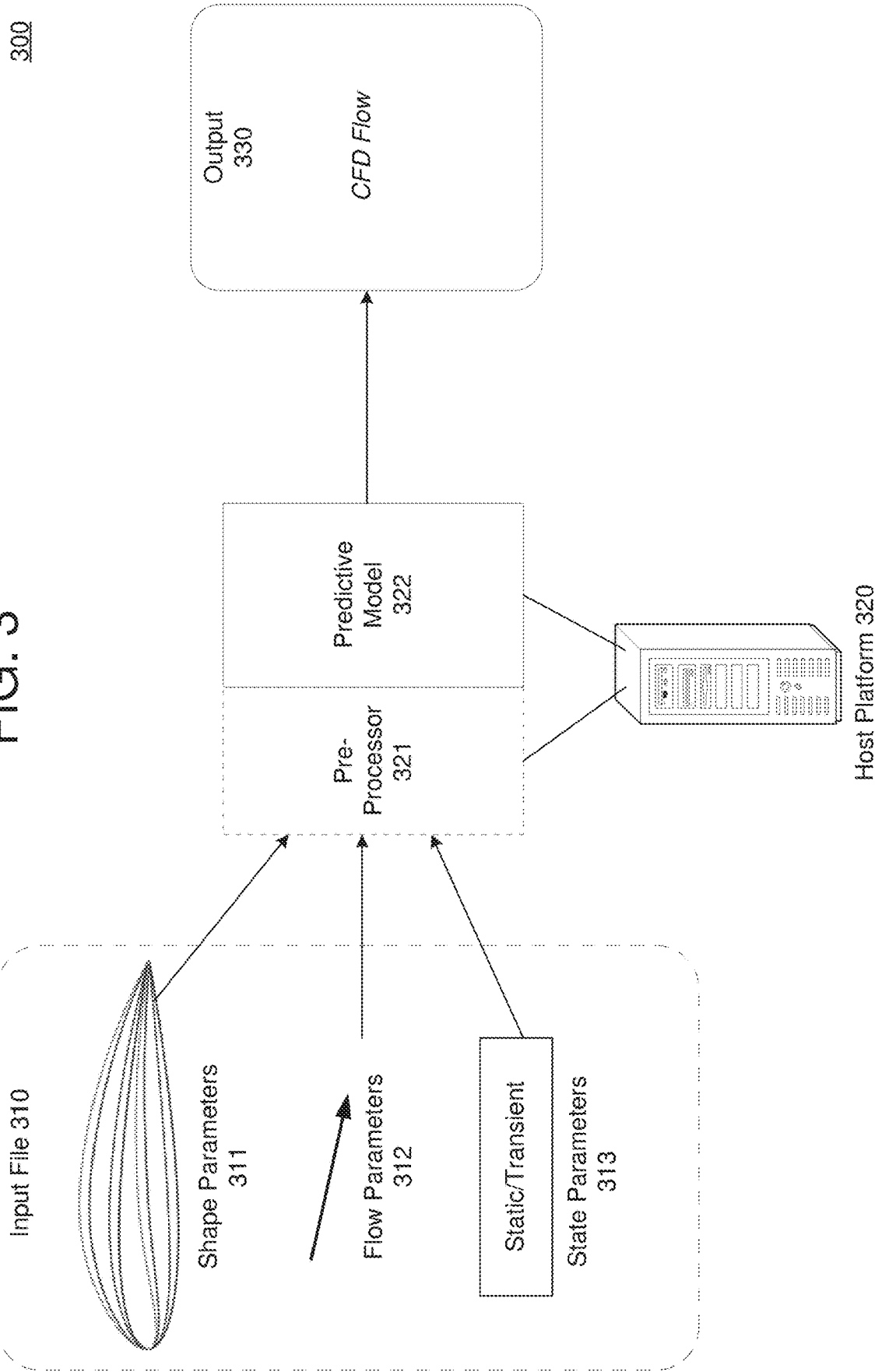
FIG. 3 is a diagram illustrating a process of generating a predictive CFD flow in accordance with an example embodiment.

FIG. 3 illustrates a process 300 of generating a predictive CFD flow in accordance with an example embodiment. Referring to the example of FIG. 3, the process 300 is performed by a host platform 320 which, for example, may be a personal computer, a laptop, a database, a server, a running instance of a cloud platform, and the like. The host platform 320 may receive an input file 310 and generate an output 330 which includes a predicted CFD flow. To generate the predicted CFD flow, the host platform 320 may execute a predictive model 322 on the input file to generate the predicted CFD output 330. In some embodiments, the host platform 320 may convert the input file into a format that can be processed by the predictive model 322 based on a pre-processor 321.

The input file 310 may include shape parameters 311 which include a geometry of an object which is being designed. The object may be an airfoil, an engine, a gas turbine, a steam turbine, a wing, or any other body of mass. The shape parameters 311 may include boundary line measurements of the object plus an information about an environment where the object is located such as an outer casing and hub in an aircraft engine and turbine. The shape parameters may include measurements, sizes, etc., of the shape as well as additional parameters about the shape. For example, an airfoil may be defined using things such a radius of a nose, a maximum thickness, a curviness, camber, etc. In this case, the shape parameters used for the predicting can be derived from the shape or used to create an approximation of the shape. The input file 310 may include flow conditions 312 such as air speed into the engine, speed the object is flying, exit conditions such as how much pressure at the exit of the engine, etc. The input file 310 may also include initial conditions 313 which can indicate whether a shape of the object is static or dynamic.

For example, the geometry of a geometric object may change (dynamic) over time. For example, an airfoil may rotate or the position may move in different directions to enable air to flow better. Other examples of dynamic shape parameters include, but are not limited to, inlet guides vanes which have a variable stagger depending on load, tip clearance control surfaces, smart materials, and the like. The dynamic shape parameters may correspond to variable geometry. In some cases, dynamic flow conditions may also be present and may include variations in boundary conditions (e.g., the flow conditions) such as variations in the design point conditions (cruise, red line, etc.)

For the deep learning, the host platform 320 may use the same input file 310 as a CFD simulator and run it through the pre-processor 321 which converts the input file 310 into something that can be used by the deep network. The pre-processor 321 creates a new representation of the geometry, flow conditions, and the initial conditions that are configured for input into the predictive model 322. The pre-processor 321 may include a translation step so it is in a format that the predictive model 322 can ingest and use.

In some embodiments, the shape parameters 311 may be mapped to a matrix. For example, an airfoil shape may be collapsed down into boundary conditions so that to the deep network it looks like a rectangular field that instead of having a hole it has a different set of boundary conditions on the interior of a grid.

The predictive model 322 may include a predictive algorithm that can predict flow in, around, thru, etc. an object, instead of requiring a CFD simulation to be run. The output 330 may be the same as if the CFD did the simulation. For example, the output 330 may include information about attributes such as velocity, turbulence, density, pressure, temperature, etc. which are detected by the CFD flow. As another example, the attributes that are displayed may include derived scalar metrics from the airflow attributes such as efficiency, loss, or the like. In some embodiments, the visualization could be a display of the steady-state or transient nature of the flow. For an airfoil, the top of the airfoil is going to be less dense than the bottom. Likewise, the top is going to have less pressure than the bottom. In some embodiments, the output 330 may include graphical/visualizations of the different attributes. In some embodiments, the output 330 may include calculations of the average values for some of attributes.

In some embodiments, multiple predictive algorithms 322 may be used to create flow predictions about a plurality of different areas of an object. For example, when the object is an airfoil, the host platform 320 may implement a predictive model about the airfoil, the inlet, the pressure side or top of the airfoil, the bottom of the airfoil, the center of the airfoil, and the like. Any of these could be used by the host platform 320. The host platform 320 may use more than one of these locations which can create more flow predictions from different locations on the object.

Figure 4:
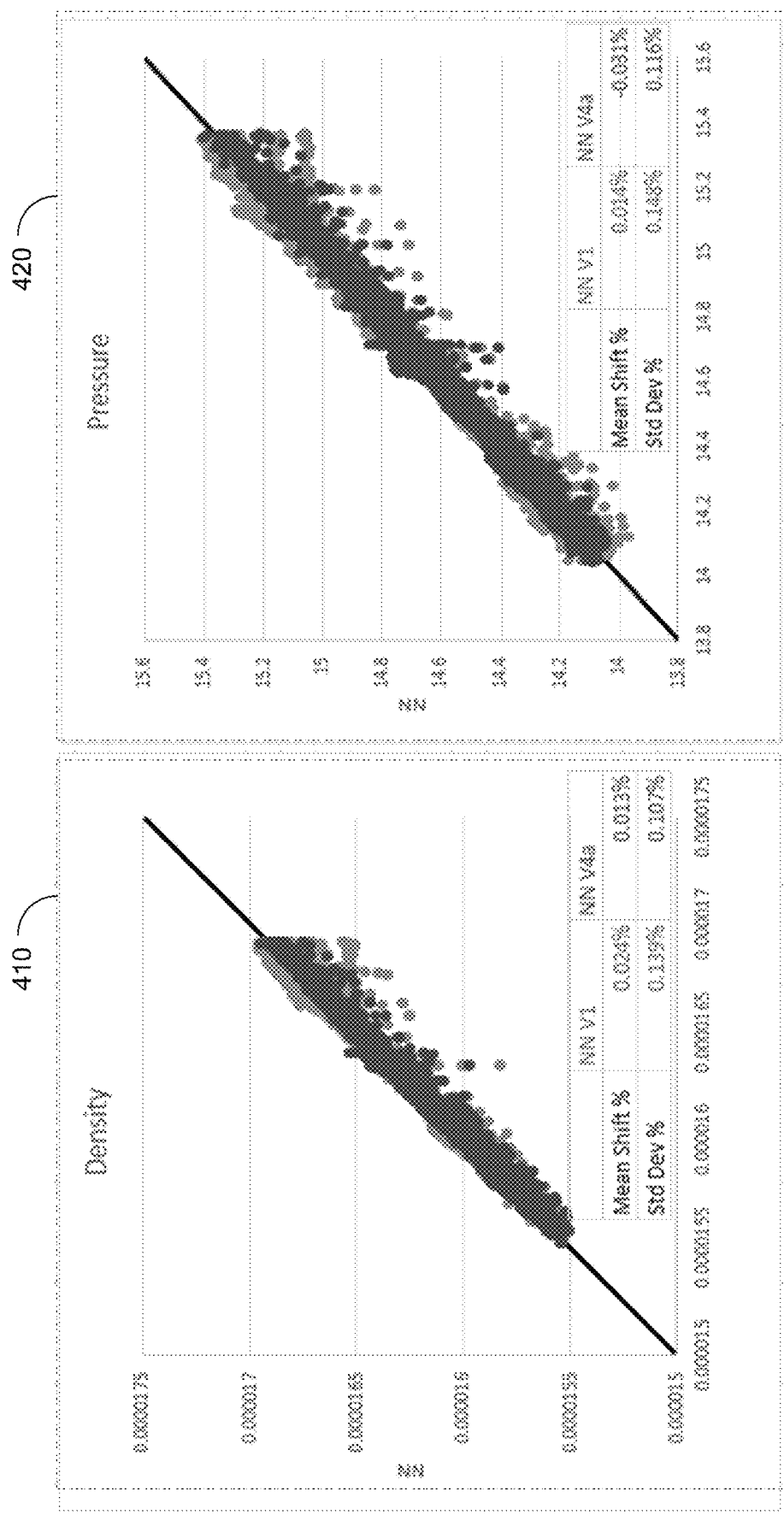
FIG. 4 is a diagram illustrating a user interface for displaying output of CDF flow attributes in accordance with an example embodiment.

FIG. 4 illustrates a user interface 400 for displaying output of CFD flow attributes in accordance with an example embodiment. In this example, the user interface 400 includes a graph 410 of density and a graph 420 of pressure over time which are measured from the object during the period of time during which the prediction of the CFD flow is created. It should be appreciated that these are just examples, and the output may include any information of the CFD flow over time including graphical displays of the object itself, visual patterns of the flow around the object, measurements taken from the flow including velocity in one or more directions, temperature, density, pressure, turbulence, and the like. The output may include average values captured from the flow over the time frame of the CFD prediction.

Figure 5:
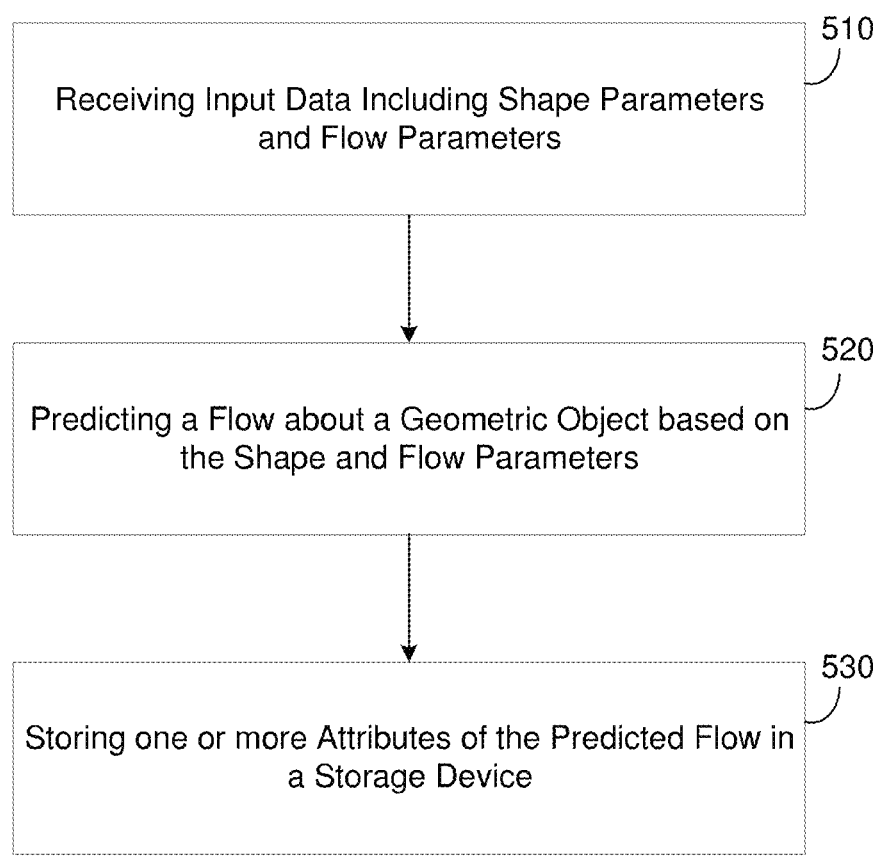
FIG. 5 is a diagram illustrating a method for determining a predictive CFD flow in accordance with an example embodiment.

FIG. 5 illustrates a method 500 for determining a predictive CFD flow in accordance with an example embodiment. For example, the method 500 may be performed by a database, a cloud platform, a server, a user device, a combination of devices, and the like. Referring to FIG. 5, in 510, the method may include receiving input data that includes shape parameters of a geometric object and flow parameters associated with the geometric object. The flow parameters may include external conditions around the geometric object. For example, external conditions may include boundary conditions and/or initial conditions in the CFD, a wind tunnel, or the like. Conditions may include what is happening at the boundaries of the simulation, what is happening at an inlet of a wind tunnel, conditions at the exits, how far away are the walls, etc. The geometric object may include a part or a component being designed for industrial use such as an airfoil, a fan, an engine, a turbine, or other body of mass. The shape parameters may define an outer boundary of the geometric object such as an airfoil, a wing, a body of mass, an engine, a fan, or the like. In some embodiments, the shape parameters of the geometric object may include non-uniform boundary parameters of an edge of the geometric object. In some examples, the flow parameters may include information about fluid flow such as velocity, pressure, direction, and the like.

In 520, the method may include predicting, via execution of a predictive model, a computational fluid dynamic (CFD) flow about the geometric object based on the shape parameters and the flow parameters included in the input data. Here, the input data may be input to the predictive model. The predictive model may generate the CFD flow based on the various parameters included in the input data. Furthermore, in 530, the method may include outputting one or more attributes of the predicted CFD flow about the geometric object via a display device. In some embodiments, although not shown in the method 500 of FIG. 5, the method may include converting the shape parameters and the flow parameters into a numerical format that is configured for processing by the predictive model prior to predicting the CFD flow.

In some embodiments, the predicting may further be performed based on whether the shape parameters of the geometric object are constant or dynamic over time. Here, the predicting may be based on constant and dynamic shape parameters of the geometric object which change in response to steady and unsteady flow conditions, or the like. The unsteady state may indicate that a vortex is created in the air space around the geometric object during the flow. In some embodiments, the predictive model may be configured to predict flow about an object, and the predictive model is trained based on a deep learning neural network. In some embodiments, the predictive model may include a surrogate for a CFD computer simulation of the CFD flow. In some embodiments, the outputting the one or more attributes may include outputting graphical data about one or more of velocity, turbulence, density, pressure, and temperature, included in the predicted CFD flow.

Figure 6:
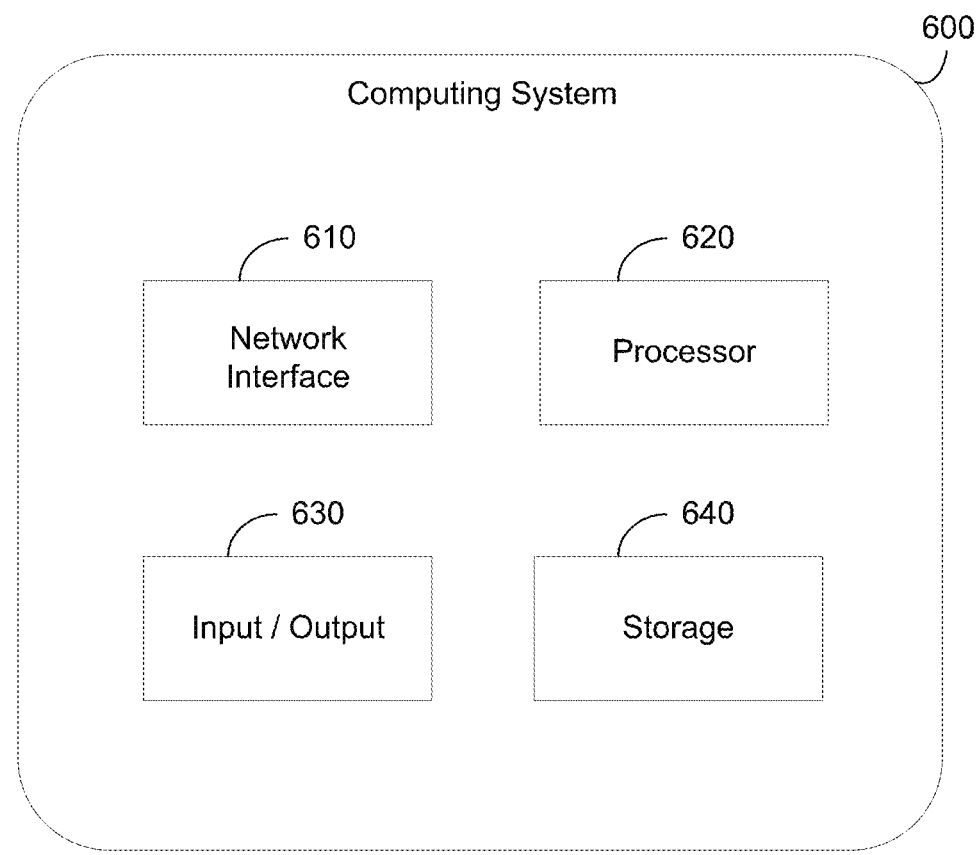
FIG. 6 is a diagram illustrating a computing system for use with any of the example embodiments.

FIG. 6 illustrates a computing system 600 in accordance with an example embodiment. For example, the computing system 600 may be a cloud platform, a server, a user device, or some other computing device with a processor. Also, the computing system 600 may perform the method of FIG. 5. Referring to FIG. 6, the computing system 600 includes a network interface 610, a processor 620, an input/output 630, and a storage device 640. Although not shown in FIG. 6, the computing system 600 may include other components such as a display, a microphone, a receiver/transmitter, and the like. In some embodiments, the processor 620 may be used to control or otherwise replace the operation of any of the components of the computing system 600.

The network interface 610 may transmit and receive data over a network such as the Internet, a private network, a public network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. The input/output 630 may be a hardware device that includes one or more of a port, an interface, a cable, etc., that can receive data input and output data to (e.g., to an embedded display of the device 600, an externally connected display, an adjacent computing device, a cloud platform, a printer, an input unit, and the like. The storage device 640 is not limited to any particular storage device and may include any known memory device such as RAM, ROM, hard disk, and the like. In some embodiments, the storage 640 may be configured and reconfigured based on a predetermined partitioning scheme, a subsequent re-partitioning scheme, and the like.

According to various embodiments, the storage 640 may store input data such as an input file which includes shape parameters of a geometric object and it flow parameters associated with the geometric object. The input file may include a document, a table, an XML file, or the like. In some embodiments, the input data may be received by the network interface 610 from another device via a network such as the Internet. As another example, the input data may be provided locally such as through a drive, disc, etc., that is attached to the computing system 600 through a USB port, etc. According to various embodiments, the processor 620 may predict, via execution of a predictive model, a computational fluid dynamic (CFD) flow about the geometric object based on the shape parameters and the flow parameters included in the input data, and output one or more attributes of the predicted CFD flow about the geometric object via a display device.

The geometric object may be a non-uniformly shaped object having an outer boundary that can vary based on the input. In some embodiments, the geometric object may include an airfoil that is included in at least one of an aircraft engine, a gas turbine, and a steam turbine. As another example, the geometric object may include a blade, a pipe, a machine body, and the like. In some embodiments, the shape parameters of the geometric object may include non-uniform boundary parameters of an edge of the geometric object. The parameters may identify a size of the geometric object, a shape of the geometric object, and the like. The shape information may include curves, lines, radii, width, length, depth information, and the like. The geometric object may be a two-dimensional object or a three-dimensional object.

In some embodiments, the processor 620 may convert the shape parameters and the flow parameters into a numerical format that is configured for processing by the predictive model. The format may be configured such that it can be input into the predictive model. In some embodiments, the processor 620 may predict the CFD flow about the geometric object based on constant and dynamic shape parameters of the geometric object. For example, the system may capture steady and unsteady flow. This is an extension of a non-constant geometry that changes over time. The airfoil shape may be constant but it may be rotated or position may be moved to accept flow. A static state may indicate that a shape of the geometric object stays static or is otherwise in a steady-state during the flow.

In the examples described herein, the predictive model is configured to predict flow about an object such as an airfoil. According to various embodiments, the predictive model is trained based on a deep learning neural network which may include nodes that take into consideration flow parameters, geometric parameters, etc., and which also include convolution layer(s), deconvolution layer(s), additional hidden layer(s), and the like. The predictive model acts as a surrogate for a CFD computer simulation of the CFD flow and can be used instead of a CFD computer simulation. The input may be the same and the output may be the same as in a traditional CFD simulation. However, rather than taking hours or days, the predictive model can predict a CFD flow in seconds. Furthermore, the processor 620 may output graphical data about the predicted CFD flow similar to a CFD simulation. For example, the output may include a graph or other visual data of one or more of velocity, turbulence, density, pressure, and temperature, included in the predicted CFD flow.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:
1. A computing system comprising:
  a storage configured to store input data comprising shape parameters of a geometric object and flow parameters associated with external conditions of a flow; and
  a processor configured to transform the shape parameters and the flow parameters into a vector and input the vector into a machine learning model running on the computing system, output, via the machine learning model, a predicted CFD flow about the geometric object based on the shape parameters and the flow parameters included in the input, wherein the machine learning model has been previously trained based on historical simulations of CFD flows created by executing a CFD simulation system, measure a density value of the predicted CFD flow about the geometric object from the predicted CFD flow about the geometric object, and display a visualization of the predicted CFD flow about the geometric object and the density value measured from the predicted CFD flow about the geometric object.

2. The computing system of claim 1, wherein the predicted CFD flow about the geometric object comprises a predicted flow about an airfoil.

3. The computing system of claim 2, wherein the airfoil comprises at least one of an aircraft engine, a gas turbine, a wind turbine, and a steam turbine.

4. The computing system of claim 1, wherein the processor is further configured to predict the CFD flow about the geometric object based on constant and dynamic shape parameters for the geometric object under steady and unsteady flow conditions.

5. The computing system of claim 1, wherein the machine learning model comprises a deep learning neural network.

6. The computing system of claim 1, wherein the processor is further configured to display graphical data about one or more of velocity, turbulence parameters, density, pressure, enthalpy, and temperature, of the predicted CFD flow.

7. A method comprising:
receiving input data comprising shape parameters of a geometric object and flow parameters associated with external conditions of a flow;

transforming the shape parameters and the flow parameters into a vector and inputting the vector into a machine learning model running on a computing system;

outputting, via the machine learning model, a predicted CFD flow about the geometric object based on the input vector, wherein the machine learning model has been previously trained based on historical simulations of CFD flows created by executing a CFD simulation system;

measuring a density value of the predicted CFD flow about the geometric object from the predicted CFD flow about the geometric object, and displaying a visualization of the predicted CFD flow about the geometric object and the density value measured from the predicted CFD flow about the geometric object.

8. The method of claim 7, wherein the predicted CFD flow about the geometric object comprises a predicted flow about an airfoil.

9. The method of claim 8, wherein the airfoil comprises at least one of an aircraft engine, a gas turbine, a wind turbine, and a steam turbine.

10. The method of claim 7, wherein the predicting comprises predicting the CFD flow about the geometric object based on constant and dynamic shape parameters for the geometric object under steady and unsteady flow conditions.

11. The method of claim 7, wherein the machine learning model comprises a deep learning neural network.

12. The method of claim 7, wherein the method further comprises displaying graphical data about one or more of velocity, turbulence parameters, density, pressure, enthalpy, and temperature, of the predicted CFD flow.

13. A non-transitory computer-readable medium storing instructions which when executed by a processor cause a computer to perform a method comprising:
receiving input data comprising shape parameters of a geometric object and flow parameters associated with external conditions of a flow;

transforming the shape parameters and the flow parameters into a vector and inputting the vector into a machine learning model running on a computing system;

outputting, via the machine learning model, a CFD flow about the geometric object based on the input vector, wherein the machine learning model has been previously trained based on simulations of CFD flows created by executing a CFD simulation system;

measuring a density value of the predicted CFD flow about the geometric object from the predicted CFD flow about the geometric object; and displaying a visualization of the predicted CFD flow about the geometric object and the one or more of the density value and the pressure value measured from the predicted CFD flow about the geometric object.

14. The non-transitory computer-readable medium of claim 13, wherein the predicted CFD flow about the geometric object comprises a predicted flow about an airfoil.

15. The non-transitory computer-readable medium of claim 14, wherein the airfoil comprises at least one of an aircraft engine, a gas turbine, a wind turbine, and a steam turbine.

* * * * *